United States Patent [19]
Schultz, Jr.

[11] 3,906,821
[45] Sept. 23, 1975

[54] APPARATUS FOR SEPARATING PLASTIC CONTAINERS

[75] Inventor: Donald F. Schultz, Jr., Irvine, Calif.

[73] Assignee: Ethyl Development Corporation, Kansas City, Mo.

[22] Filed: Sept. 18, 1974

[21] Appl. No.: 506,989

[52] U.S. Cl. .............................. 82/79; 82/80; 82/81; 82/86; 82/101
[51] Int. Cl.² .......................................... B23B 5/14
[58] Field of Search ........................ 82/79-81, 83, 82/86, 90, 99, 101, 102

[56] References Cited
UNITED STATES PATENTS

| | | | |
|---|---|---|---|
| 2,459,068 | 1/1949 | Eastwood | 82/101 |
| 2,771,662 | 11/1956 | Ziska | 82/83 |
| 3,021,736 | 2/1962 | Schuetz | 82/101 X |

FOREIGN PATENTS OR APPLICATIONS

| | | | |
|---|---|---|---|
| 1,099,488 | 4/1958 | Germany | 82/83 |

*Primary Examiner*—Leonidas Vlachos
*Attorney, Agent, or Firm*—Donald L. Johnson; John F. Sieberth; Edgar E. Spielman, Jr.

[57] ABSTRACT

An apparatus for separating two blow-molded, plastic containers which are joined at their necks is disclosed. The apparatus receives the joined plastic containers between at least three sets of rollers which grip and rotate the bottles. At least one circular knife is moved into engagement with the rotating bottles to separate them at their necks by cutting. The rollers and knife are actuated through a series of cams.

27 Claims, 9 Drawing Figures

APPARATUS FOR SEPARATING PLASTIC CONTAINERS

BACKGROUND OF THE INVENTION

Hollow, plastic articles, such as containers, may be formed by blow-molding techniques. These techniques utilize mold halves which define a mold cavity. Generally, to form a container a hot plastic tube will be first drawn in between the two mold halves. The mold is then closed pinching off opposite ends of the tube. Pressurized air is introduced into the closed-off tube through a blow needle inserted thereinto. The pressurized air acts to expand the tubing to the configuration of the mold cavity.

Formation of a plurality of containers simultaneously can be achieved by the utilization of tandem molds. These tandem molds can be provided with axially aligned body cavities joined together by central neck cavities. In these instances, the blow needle is inserted into the closed tube at the location of the central neck cavity. After insertion and expansion of the tube to the configuration of the mold cavities, the blow needle is withdrawn and the tandem mold is opened and the blown and still joined containers are removed. Separation of the containers after their removal is necessary and is generally achieved by severing or cutting a section of the plastic material in the area of the container necks.

To this end it is an object of this invention to provide an apparatus which achieves separation of plastic containers which are joined together at their necks.

THE INVENTION

This invention relates to an apparatus for separating two cylindrical plastic containers which are joined at their necks which features: (a) a support structure; (b) a first movable, elongated member pivotally connected to the support structure, the first movable member being arcuately movable about the pivot point in a downward direction by a first power-driven cam operating in association with a first cam follower connected to the first movable member and in an upward direction by a first return mechanism connected to the first movable member; (c) a power-driven, rotating mechanism connected to the first movable member for rotating the container about its center axis; (d) a second movable member carrying a keeper which holds the container in frictional engagement with the rotating mechanism, the second movable, elongated member being pivotally connected to the support structure and being arcuately movable about the pivot point in an upward direction by a second power-driven cam operating in association with a second cam follower connected to the second movable member and in a downward direction by a second return mechanism connected to the second movable member; (e) a third movable, elongated member carrying a cutting mechanism for separating the containers at their necks, the third movable member being pivotally connected to the support structure and arcuately movable about the pivot point in a downward direction by a third power-driven cam operating in association with a third cam follower connected to the third movable member, and in an upward direction by a third return mechanism connected to the third movable member; and (f) a first power-driving apparatus to drive the various cams and a second power-driving apparatus for driving the rotating mechanism.

These and other features of the invention contributing to its use and economy will be more fully understood from the following description of a preferred embodiment of this invention when taken in connection with the accompanying drawings wherein identical numerals refer to identical parts and in which.

Figure 1:
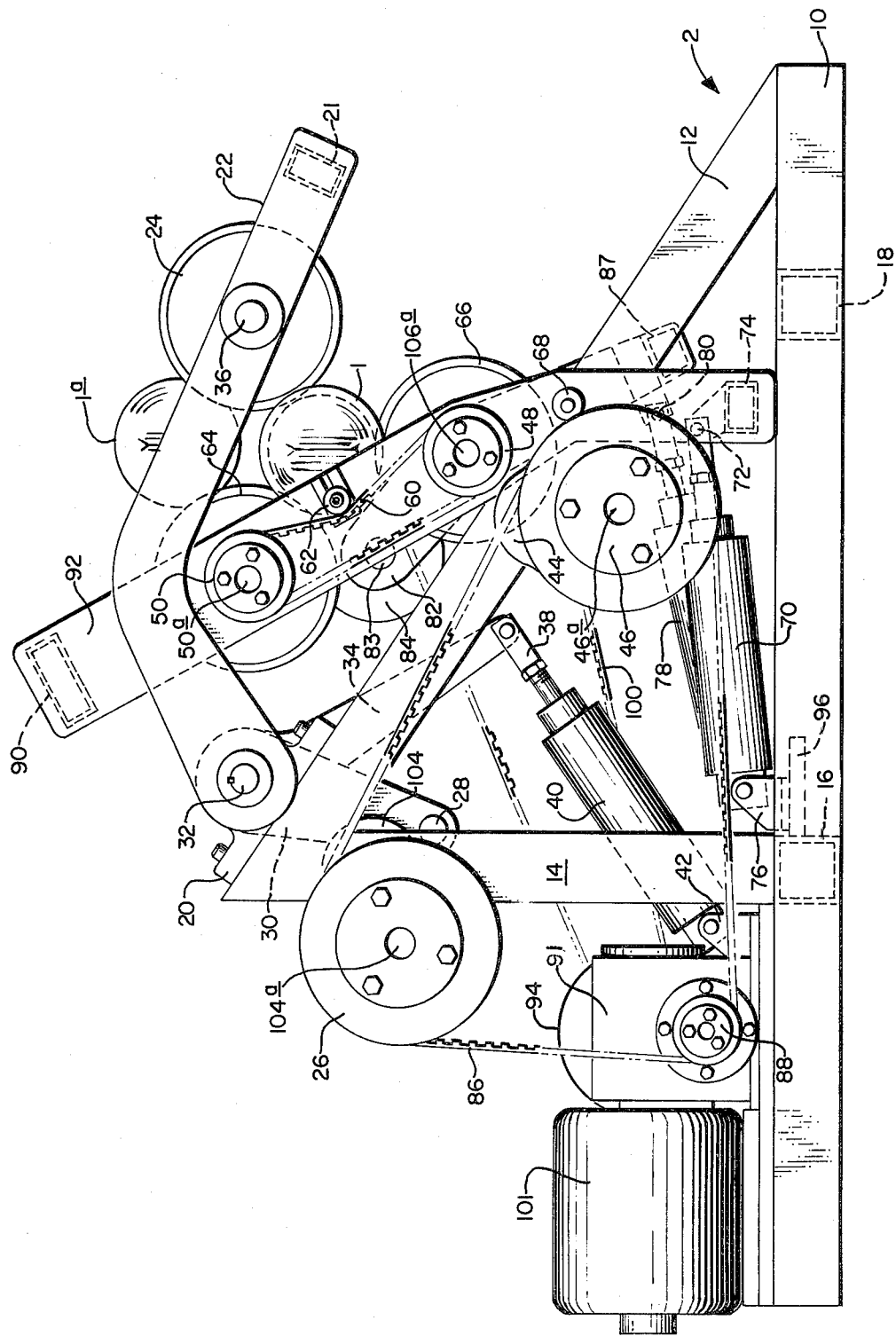
FIG. 1 is a left side elevational view of an apparatus of this invention.
Figure 2:
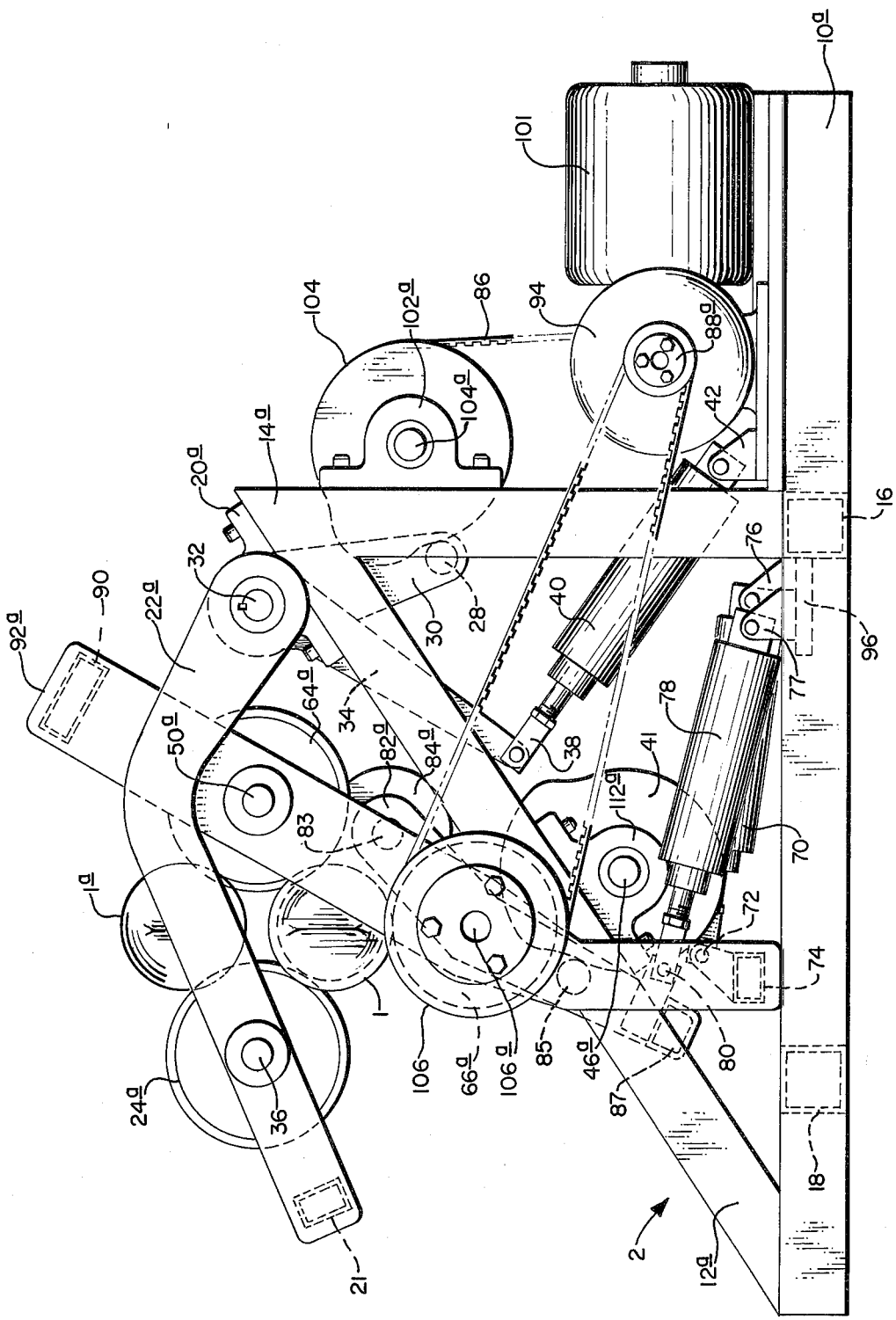
FIG. 2 is a right side elevational view of the apparatus of FIG. 1.
Figure 3:
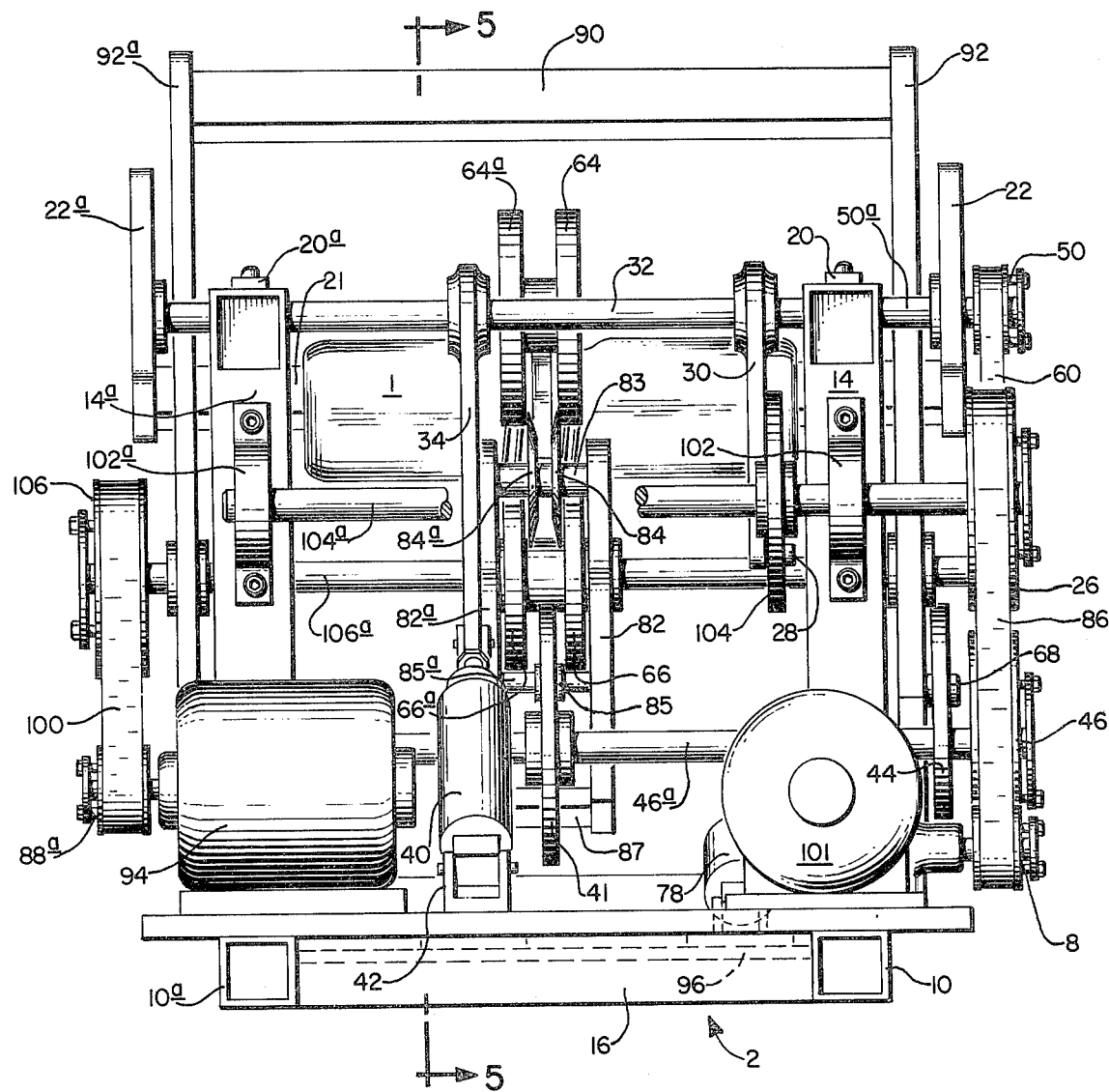
FIG. 3 is a front elevational view of the apparatus of FIG. 1.
Figure 4:
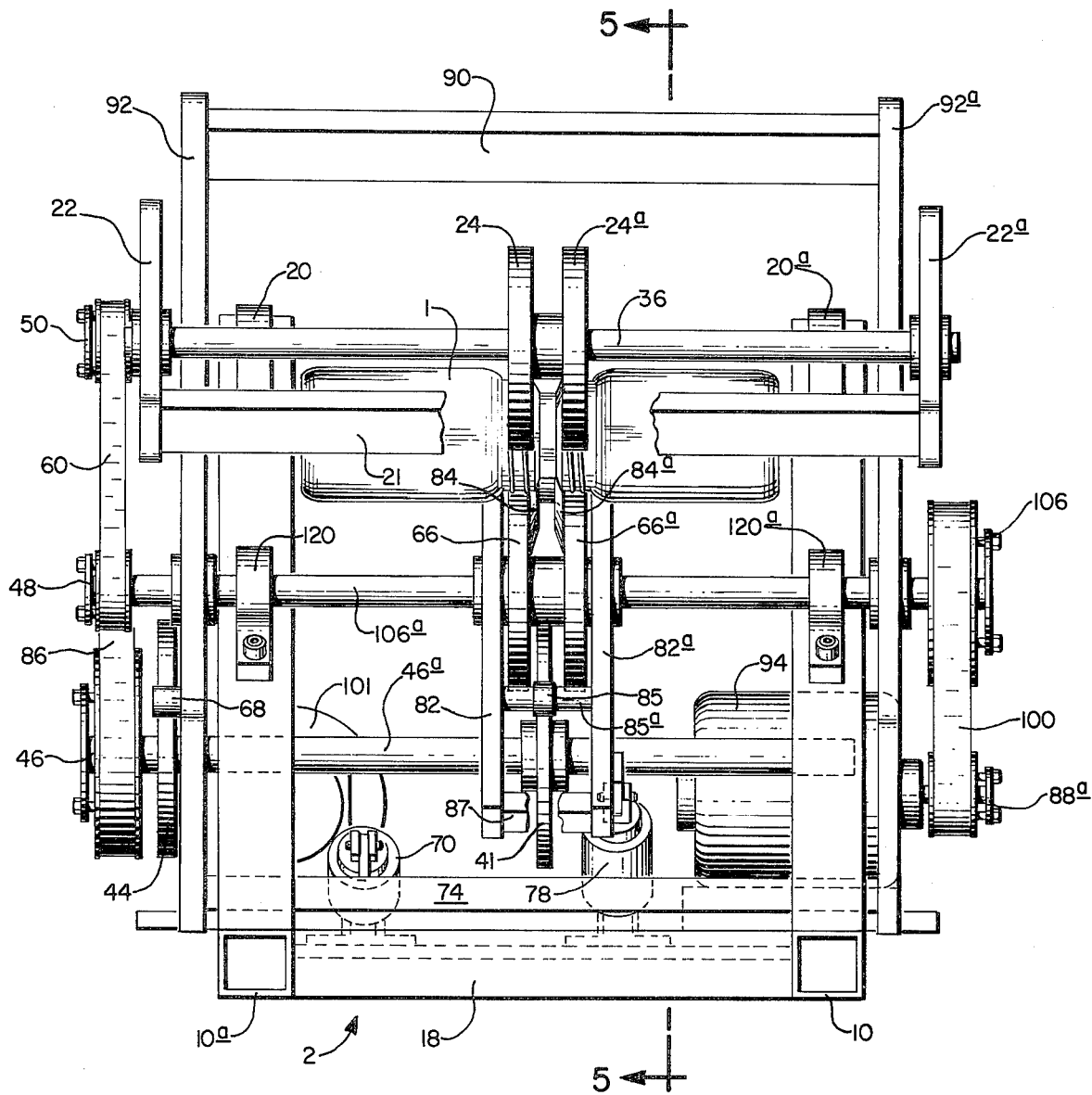
FIG. 4 is a rear elevational view of the apparatus of FIG. 1.
Figure 5:
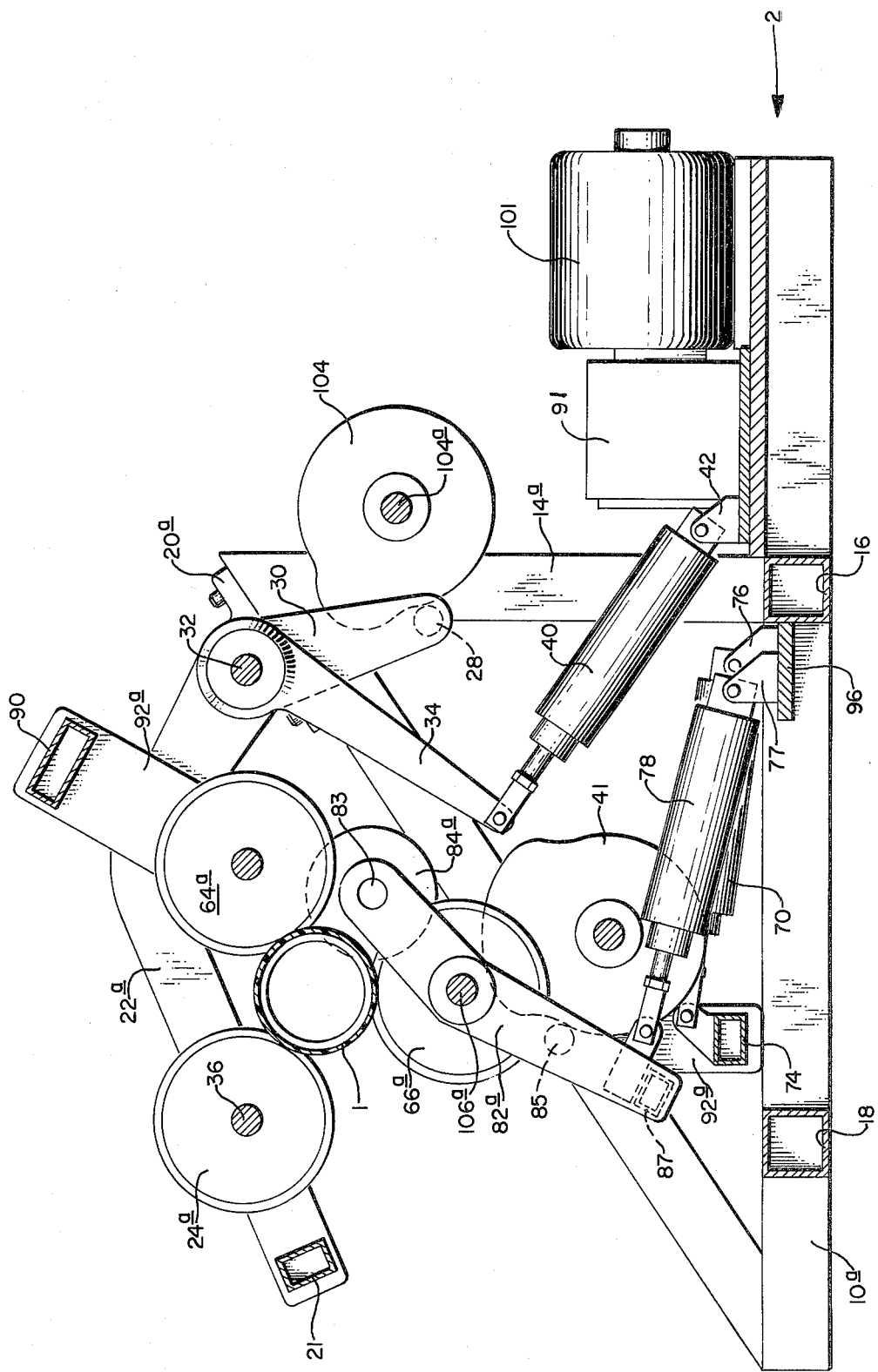
FIG. 5 is a sectional view taken along section lines 5—5 in FIGS. 3 and 4.

Referring now to FIGS. 1–5, it can be seen that support structure, generally designated by the numeral 2, comprises two horizontal beams 10 and 10a attached one to the other by cross beams 16 and 18. These four beams form a generally rectangular base upon which two vertical beams 14 and 14a and two angled beams 12 and 12a are mounted. Angled beams 12 and 12a attach, at one of their ends, to the upper portion of vertical beams 14 and 14a and at their other ends to horizontal beams 10 and 10a. Attachment of all of these beams is most conveniently achieved by welding. As can be seen from the drawing, these beams are rectangular in cross-section, however, other configuration such as I or H configuration is quite suitable.

Attached to the outside surface of vertical beams 14 and 14a are keeper shaft bearings 102 and 102a. Received in the bearings is keeper shaft 104a. Mounted on keeper shaft 104a is keeper cam 104. As can be seen in the drawings, keeper cam 104 is a disk having a camming protuberance on its periphery. Also mounted on shaft 104a is pulley 26. Pulley 26 is connected to power source 101 and power source gear assembly 90 by means of belt 86 and gear assembly pulley 88. By being so connected, pulley 26 powers keeper cam 104 to engage keeper cam follower 28 which follows the periphery of keeper cam 104. Keeper cam follower 28 is mounted on keeper cam follower arm 30. Keeper cam follower arm 30 is rigidly attached to keeper axle 32. Keeper axle 32 fits within keeper axle bearings 20 and 20a which are attached respectively to angled beams 12 and 12a.

Attached to keeper axle 32 is one end of keeper arms 22 and 22a which are, in this embodiment, parallel to one another. Keeper arms 22 and 22a are attached at their other ends by keeper arm beam 21 which lends structural integrity to the pair. To keeper arms 22 and 22a and between keeper beam 21 and keeper axle 32 is mounted keeper disk axle 36 which carries keeper disks 24 and 24a. Keeper disks 24 and 24a have a periphery of rubber which insures frictional engagement with container 1. In the illustrated embodiment two keeper disks are shown, however, it is to be understood that less than two or more than two disks may be suitable.

Also attached to keeper axle 32 is keeper return arm 34. Keeper return arm 34 is attached at the end opposite its attachment to keeper axle 32 to a pneumatic cushion return cylinder 40 by means of connector 38. Pneumatic cushion return cylinder 40 is also rigidly attached to support structure 2 by connector 42.

It will be noted from the drawings that keeper arms 22 and 22a are angled so that keeper disks 24 and 24a are in a position to keep container 1 in frictional engagement with the rotation disks hereinafter described. The angle, as shown in the drawings, approximates about 35°. This angle is not critical but is rather one which is adapted for the illustrated particular embodiment of the instant invention. Other angles may be required for other structural embodiments which differ from the details of the embodiment shown in the drawings.

Also attached to angled beams 12 and 12a are, respectively, rotating bearings 120 and 120a. The point of connection, as can be seen from the drawings, is approximately half-way up the length of angled beams 12 and 12a. These bearings hold in support container rotating axle 106a. Attached to rotating axle 106a are bottom rotating disks 66 and 66a. These disks have about their periphery a rubber strip which helps maintain frictional engagement with container 1. It is to be understood that there may be used less than or more than two rotating disks.

Also connected to rotating axle 106a are rotation arms 92 and 92a. Rotation arms 92 and 92a are connected in parallel to one another by means of lower rotation arm connector 74 and upper rotation arm connector 90. Connected to rotation arms 92 and 92a at a point above rotating axle 106a but below upper rotation arm connector 90 is upper axle 50a which carries upper rotation disks 64 and 64a. As can be seen from the drawing, upper rotation disks 64 and 64a and lower rotation disks 66 and 66a are spaced apart on the rotation arms whereby approximately ⅓ of the circumference of container 1 is caught therebetween. The utilization of less or more rotation disks is permissible and may be determined based upon the particular demands of the practitioner of this invention. Also more or less than ⅓ of the container circumference may be caught between the rotation disks as long as the disks are sufficiently close one to the other so that the container will not fall through.

Driving rotation disks 66, 66a, 64 and 64a is electrical motor 94. Power is transmitted to the lower rotating disks 66 and 66a by means of belt 100 which rides within electric motor pulley 88a and rotation pulley 106. Rotation pulley 106 is connected to rotation axle 66b. Transference of power to upper rotating disks 64 and 64a is achieved by use of lower rotation pulley 48 and upper rotation pulley 50 which carry rotation belt 60. A belt-tension adjuster 62 is also employed to insure efficient utilization of power from electric motor 94.

Upward and downward motion of rotation arms 92 and 92a is achieved by the utilization of rotation cam 44, cam follower 68 and rotation pneumatic cushion cylinder 70.

As can be seen from the drawings, rotation cam 44, which is a disk having a camming protuberance on its periphery, is mounted on rotation cam axle 46a. Supporting rotation cam axle 46a are cam axle bearings 112 and 112a which are attached to the underside of beams 12 and 12a respectively. Rotation cam follower 68 is attached so that it will engage and track the periphery of rotation cam 44 thereby imparting movement to rotation arms 92 and 92a upon turning of rotation cam 44.

Return motion of rotation arms 92 and 92a is achieved by means of rotation pneumatic cushion cylinder 70 which is attached to arms 92 and 92a at a point beneath rotation cam follower 68. Attachment is achieved by means of rotation pneumatic cushion cylinder attachment 72. The other end of pneumatic cushion cylinder 70 is attached by means of attachment 76 mounted on plate 96 which is welded onto horizontal beam 10 and cross beam 16.

Power for turning rotation cam 44 is provided by power source 101. Power source 101 drives power source gear assembly 90 to turn cam pulley 46 by means of drive belt 86 and drive pulley 88.

Knife arms 82 and 82a are carried by rotating axle 106a. The connection of these arms with rotation axle 106a is such that the axle is allowed to turn within the arms thus not imparting any torque thereto. Knife arms 82 and 82a are connected at one end by knife arm beam 87, which lends structural integrity thereto. Connecting the other ends of knife arms 82 and 82a is knife axle 83. Carried on knife axle 83 are circular knife blades 84 and 84a. These blades should be made of high carbon steel capable of taking a very keen edge and not exhibiting rapid dulling even under continuous cutting stresses. In this particular embodiment a pair of knife blades are used as the container chosen for illustration needs to be cut in two places to give the separated containers. Containers needing only a single cut use only one blade. Imparting movement to knife arms 82 and 82a is achieved by the utilization of knife arm cam 41 which is mounted on rotation axle 46a. Knife cam 41 is in engagement with knife cam follower 85 which is connected to knife arms 82 and 82a by way of knife cam axle 85a. Knife arm cam 41 turns under power through rotation axle 46a. The lower portion of knife arm 82a has attached thereto by means of attachment 80 knife pneumatic cushion cylinder 78. Pneumatic cushion cylinder 78 is in turn connected to horizontal beam 10a by means of connector 77 and plate 96.

The apparatus of this invention features simplicity in operation and economy of construction. All of the structural supports and arm supports can be made of medium grade steel. Where not specified, all connections can be made by welding. It is preferable to bolt the bearings where possible as changing of the bearings will then be easily facilitated. The two power sources 101 and 90 are preferably electric motors having a rating of ¾ hp each. The pneumatic cushion cylinder may of course be replaced with other mechanisms which would serve the same purpose. It has been found that tension coil springs are highly suitable as replacement for the pneumatic cushion cylinder.

Figure 6:
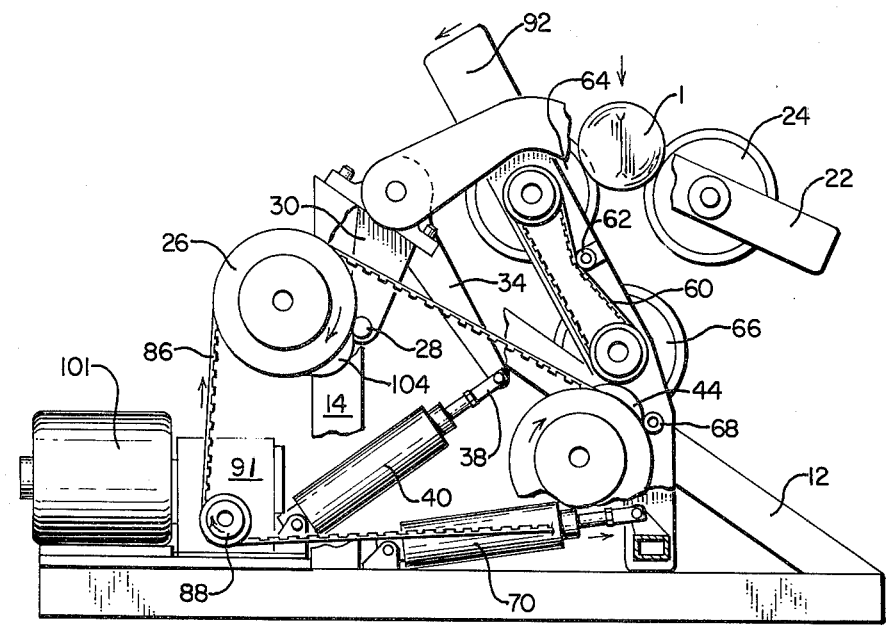
FIGS. 6–7 are left, broken, partial, elevational views of the apparatus of FIG. 1 illustrating a portion of the cyclic operation of this apparatus.

FIGS. 6–9 show the complete cutting cycle of the apparatus of this invention. In these figures the containers are joined together at their mouths by way of a waist ring (shown as 2 in FIG. 9). In FIG. 6 it can be seen that keeper arm 22 and rotation arm 92 are in a closed position which results in upper rotation disk 64 and keeper disk 24 being in close enough proximity whereby container 1 is not allowed to drop therebetween.

Figure 7:
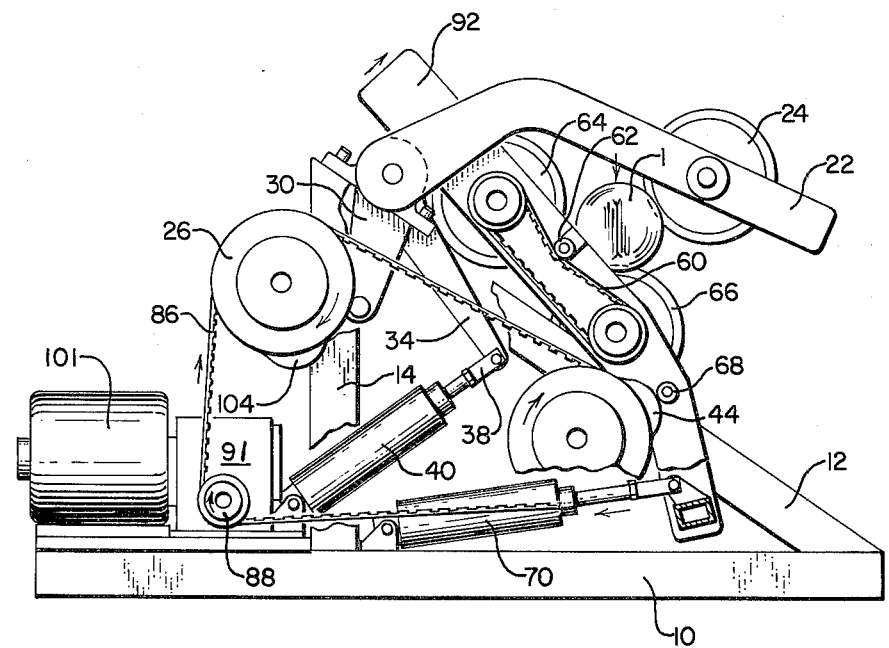

FIG. 7 shows the next step in the cycle of operation in which keeper arm 22 and rotation arm 92 are in an open position allowing for container 1 to fall through. In this position keeper arm 22 does not move while rotation arm 92 moves away from the container allowing it to fall through so that it engages lower rotation disk 66. Note the position of rotation cam 44 and rotation cam follower 68 which results in the movement of rotation arm 92.

Figure 8:
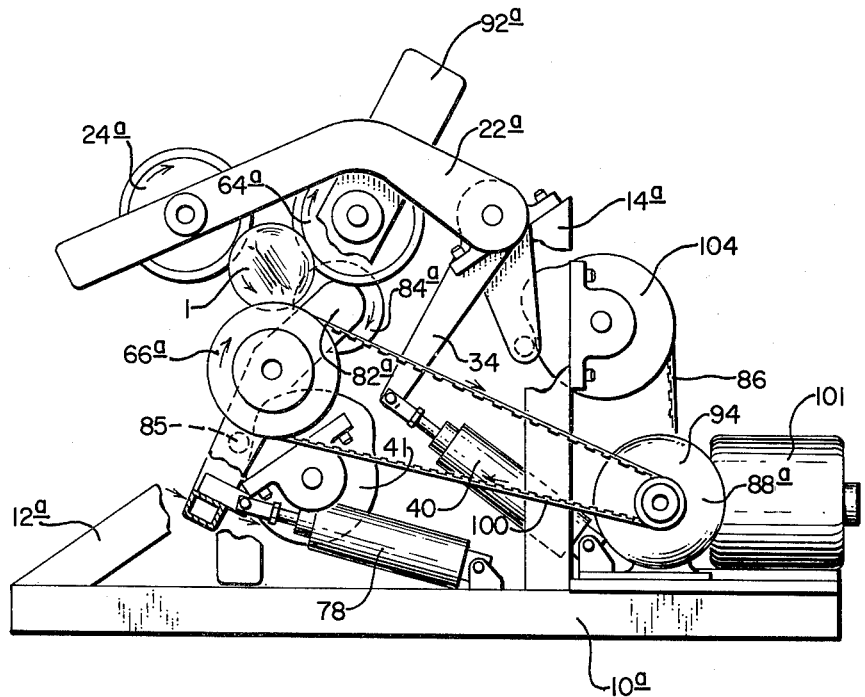
FIGS. 8–9 are right, broken, partial, elevational views of the apparatus shown in FIG. 1 completing the cycle illustrated in FIGS. 6–7.

FIG. 8 shows the apparatus of this invention in a cutting position with keeper 24a holding container 1 in frictional engagement with lower rotational disk 66a and upper rotational disk 64a. At this point knife 84a is shown in the cutting position severing the two containers.

Figure 9:
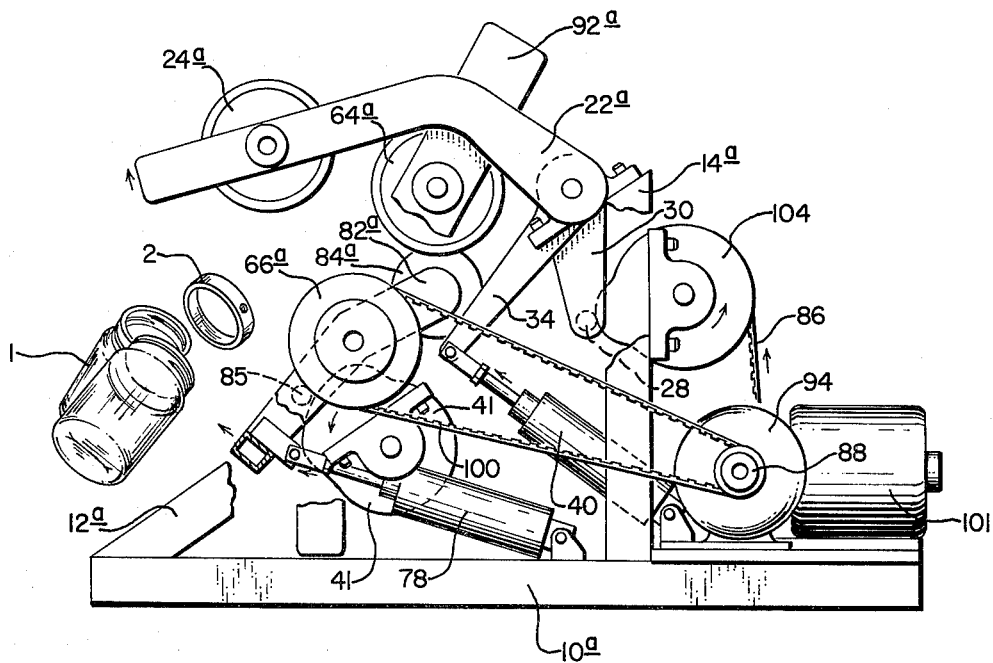

In FIG. 9 the final sequence of the cycle is shown. In this sequence keeper arm 22a is raised upward thereby allowing the container 1 and waist ring 2 to fall from lower rotational disk 64a. Also knives 84a are retracted. Retraction of knife 84a is achieved by knife cam 41 and knife cam follower 85. The raising of keeper arms 22a is achieved by keeper cam 104 and keeper cam follower 28. The final step of the cycle is to return to the configuration shown in FIG. 6.

As can be seen from the foregoing, the apparatus of this invention provides a speedy manner by which two bottles may be separated. It can also be seen that the bottles may be fed continuously to the machine with the waiting period from one container to the next being only the time interval required for the full cycle of the apparatus.

Exemplary of the plastic containers which may be utilized as feed to the apparatus of this invention are those made of various thermoplastic materials, e.g., high, medium or low density polyethylene, polypropylene, polystyrene, styrene-acrylonitrile polymers, polycarbonates, nylon, acetyl polymers or copolymers, polyvinyl chloride polymers or copolymers, or the like.

What is claimed is:

1. In an apparatus for separating two cylindrical plastic containers which are joined at their necks, the combination comprising:
   a. a support means;
   b. a first movable, elongated member pivotally connected to said support means, said first movable member being arcuately movable about said pivot point in a downward direction by a first power-driven cam means operating in association with a first cam follower means connected to said first movable member and in an upward direction by a first return means connected to said first movable member;
   c. a power-driven, rotating means connected to said first movable member for rotating said container about its center axis;
   d. a second movable member carrying a keeper means which holds said container in frictional engagement with said rotating means, said second movable, elongated member being pivotally connected to said support means and being arcuately movable about said pivot point in an upward direction by a second power-driven cam means operating in association with a second cam follower means connected to said second movable member and in a downward direction by a second return means connected to said second movable member;
   e. a third movable, elongated member carrying a cutting means for separating said containers at their necks, said third movable member being pivotally connected to said support means and arcuately movable about said pivot point in a downward direction by a third power-driven cam means operating in association with a third cam follower means connected to said third movable member, and in an upward direction by a third return means connected to said third movable member; and
   f. a first power means for driving said cam means and a second power means for driving said rotating means.

2. In the apparatus of claim 1 wherein said first member has at least two spaced-apart first arms, said first arms being connected together adjacent to one of their ends by an upper first arm-connecting means and adjacent to the other end by a lower first arm-connecting means.

3. In the apparatus of claim 2 wherein said first arms are pivotally connected to said support means at a point between said upper first arm-connecting means and said lower first arm-connecting means, and in close proximity to said lower first arm-connecting means.

4. In the apparatus of claim 3 wherein said first cam follower means is a first post extending from at least one of said first arms.

5. In the apparatus of claim 4 wherein said first power-driven cam means is a disk having a protuberance on its circumference, said disk being mounted to said support means whereby the circumference of said disk is in contact with said first post.

6. In the apparatus of claim 3 wherein said first return means is additionally connected to said support means.

7. In the apparatus of claim 3 wherein said first return means is a pneumatic cushion cylinder, said cylinder being attached on one of its ends to at least one of said first arms and on the other end to said support means.

8. In the apparatus of claim 3 wherein said first return means is a tension spring, said tension spring being attached on one of its ends to said support means and on the other end to at least one of said first arms.

9. In the apparatus of claim 3 wherein said power-driven rotating means are at least two longitudinally spaced-apart disks which are connected to at least one of said first arms at points above said pivotal connection and below said first arm connecting means whereby said pair of disks are positioned to rotate and support said container when said keeper means holds said container in frictional engagement with said pair of disks.

10. In the apparatus of claim 3 wherein said power-driven rotating means are at least two longitudinally spaced-apart pairs of disks, the first pair of disks being mounted on a first rotating axle connected to at least one of said first arms and the second pair of disks being attached to a second rotating axle connected to at least one of said first arms whereby said pair of disks are positioned to rotate and support said container when said keeper means holds said container in frictional engagement with said pairs of disks.

11. In the apparatus of claim 1 wherein said second member has at least two spaced-apart second arms, said second arms being connected together adjacent to one of the ends by a second arm connecting means and adjacent to the other end by a pivot axle, said pivot axle pivotally connecting at least one of said second arms to said support means.

12. In the apparatus of claim 11 wherein said second cam follower means is a second post which is connected to a cam follower leg attached to said pivot axle.

13. In the apparatus of claim 12 wherein said second power-driven cam means is a disk having a protuberance on its circumference, said disk being mounted on said support means whereby the circumference of said disk is in contact with said second post.

14. In the apparatus of claim 11 wherein said second return means is additionally connected to said support means.

15. In the apparatus of claim 11 wherein said second return means is a pneumatic cushion cylinder having one end thereof connected to said support means and the other end thereof connected to a return leg which is connected to said pivot axle.

16. In the apparatus of claim 11 wherein said first return means is a tension spring, said tension spring being attached on one of its ends to said support means and on the other end to a return leg attached to said pivot axle.

17. In the apparatus of claim 11 wherein said keeper means is at least one disk mounted on a keeper axle connected to at least one of said second arms and whereby said disk is positioned to maintain said container in frictional engagement with said rotating means.

18. In the apparatus of claim 17 wherein said keeper means is at least two spaced-apart disks.

19. In the apparatus of claim 1 wherein said third member has at least two spaced-apart third arms, said third arms being connected together adjacent to one of their ends by a cutting disk axle and adjacent to the other end by a third cam connecting means.

20. In the apparatus of claim 19 wherein said third arms are pivotally connected to said support means at a point between said cutting disk axle and said third arm connecting means.

21. In the apparatus of claim 19 wherein said third cam follower means is a third post extending from at least one of said arms.

22. In the apparatus of claim 21 wherein said third power-driven cam means is a disk having a protuberance on its circumference, said disk being mounted to said support means whereby the circumference of said disk is in contact with said third post.

23. In the apparatus of claim 19 wherein said return means is additionally connected to said support means.

24. In the apparatus of claim 19 wherein said third return means is a pneumatic cushion cylinder, said cylinder being attached on one of its ends to at least one of said third arms and on the other end to said support means.

25. In the apparatus of claim 19 wherein said third return means is a tension spring, said tension spring being attached on one of its ends to said support means and on the other end to at least one of said first arms.

26. In the apparatus of claim 19 wherein said cutting means is at least one cutting disk, said cutting disk being connected to at least one of said third arms above said pivotal connection whereby said cutting disk is positioned to engage said container when said container is being rotated by said rotating means.

27. In the apparatus of claim 19 wherein said cutting means is at least a spaced-apart pair of disks, said pair of disks being connected to at least one of said third arms above said pivotal connection whereby said cutting disks are positioned to engage said container when said container is being rotated by said rotating means.

* * * * *

UNITED STATES PATENT OFFICE
CERTIFICATE OF CORRECTION

PATENT NO. : 3,906,821
DATED : September 23, 1975
INVENTOR(S) : Donald F. Schultz, Jr.

It is certified that error appears in the above-identified patent and that said Letters Patent are hereby corrected as shown below.

Col. 4, line 19 reads "90", should read --91--. Col. 6, line 26 reads "cam", should read --arm--. Col. 7, line 19 reads "first", should read --second--.

Signed and Sealed this

Sixth Day of July 1976

[SEAL]

Attest:

RUTH C. MASON
*Attesting Officer*

C. MARSHALL DANN
*Commissioner of Patents and Trademarks*